US006931131B1

(12) United States Patent
Becker, Jr. et al.

(10) Patent No.: US 6,931,131 B1
(45) Date of Patent: Aug. 16, 2005

(54) METHOD AND APPARATUS FOR ONLINE GEOGRAPHIC AND USER VERIFICATION AND RESTRICTION USING A GPS SYSTEM

(75) Inventors: Philip Smith Becker, Jr., Los Angeles, CA (US); Joseph Jay Hasson, Encino, CA (US)

(73) Assignee: Youbet.com, Inc., Los Angeles, CA (US)

( * ) Notice: Subject to any disclaimer, the term of this patent is extended or adjusted under 35 U.S.C. 154(b) by 869 days.

(21) Appl. No.: 09/715,469

(22) Filed: Nov. 17, 2000

(51) Int. Cl.[7] .......................... H04K 1/00; H04L 9/00; G06F 17/00; G06F 19/00; A63F 13/00
(52) U.S. Cl. ...................... 380/258; 380/251; 713/172; 713/185; 463/29; 463/37; 463/31
(58) Field of Search ............................... 380/258, 251; 713/172, 185; 463/16, 25, 29, 31, 37

(56) References Cited

U.S. PATENT DOCUMENTS

| | | | | |
|---|---|---|---|---|
| 4,114,147 | A | * | 9/1978 | Hile ........................... 340/528 |
| 4,916,443 | A | * | 4/1990 | Barrett et al. ............... 340/5.33 |
| 5,618,232 | A | * | 4/1997 | Martin ......................... 463/25 |
| 5,711,588 | A | * | 1/1998 | Rudisill ........................ 362/30 |
| 5,871,398 | A | * | 2/1999 | Schneier et al. .............. 463/16 |
| 5,999,808 | A | * | 12/1999 | LaDue ..................... 455/412.2 |
| 6,104,815 | A | * | 8/2000 | Alcorn et al. ................ 380/251 |
| 6,175,307 | B1 | * | 1/2001 | Peterson ..................... 340/531 |
| 6,272,638 | B1 | * | 8/2001 | Yasuoka ..................... 713/200 |
| 6,507,852 | B1 | * | 1/2003 | Dempsey et al. ........... 707/201 |

FOREIGN PATENT DOCUMENTS

JP             2002101091 A  *  4/2002   ............. H04L 9/32

OTHER PUBLICATIONS

Weiss, Kenneth. "When A Password Is Not A Password", 1990 IEEE.*
Microsoft. Microsoft Computer Dictionary, Fourth Edition, 1999, p. 439.*
Sovocool, Daniel R. "GPS: Charting New Terrain: Legal Issues Related To GPS-Based Navigation and Location Systems",May 1999, <http://library.lp.findlaw.com>.*

* cited by examiner

Primary Examiner—Gregory Morse
Assistant Examiner—Michael J. Simitoski
(74) Attorney, Agent, or Firm—Blakely Sokoloff Taylor & Zafman

(57) ABSTRACT

A method and system for determining geographic location and mental state of a user. A GPS circuit is to generate signals representing a geographic location. The system uses a host computer and a local computer connected to each other over a network. A keypad is used to enter provided sequence information which is sent to the host computer if entered within a set period of time along with geographic location information provided by a GPS system and serial number information. The host computer verifies that the sequence information, serial number and geographic location information are as expected and if so, allows a user access to certain information provided by the host system.

9 Claims, 3 Drawing Sheets

METHOD AND APPARATUS FOR ONLINE GEOGRAPHIC AND USER VERIFICATION AND RESTRICTION USING A GPS SYSTEM

In many states and counties, online wagering is restricted to specific locations and to certain people. Typically, local laws require that the bettor be of legal age, be in a "suitable" mental state, and be located in a specific geographic area that does not prohibit gambling and/or online wagering. Typically, an online wagering system works as follows:
1. User browses to the online wagering site.
2. User selects a desired wagering proposition and wager amount, and then transmits his selection to the wagering host.
3. If the user has not previously logged in during this session, the system prompts him to do so at this time.
4. The system verifies the location and identification of the user.
5. If the location and identification are acceptable, the wager is accepted.
6. The system notifies the user that the wager has been accepted.
7. Repeat steps 2 through 6 as desired.

The invented online bettor location and verification system is used to perform step 4 as well as an additional step to ensure that the user is of proper mental state to wager.

SUMMARY OF THE INVENTION

The invented online bettor location and verification system is to satisfy the geographic and identification requirements demanded of wagering governing bodies such as the Nevada Gaming Commission. In general these governing bodies require that any computer-based wagering system must verify that a bettor is who the bettor says he is and where the bettor says he is before the system will accept a wager.

Specifically the invented online bettor location and verification system will:
Verify that the better is in a legal location to place a wager.
Verify the identity of the bettor
Determine whether the bettor is of acceptable state of mind for wagering.
Prevent potential users from defeating or bypassing ("spoofing") the system.
Establish a reliable and secure link between the user's computer and the host betting site.

DETAILED DESCRIPTION OF THE INVENTION

Figure 1:
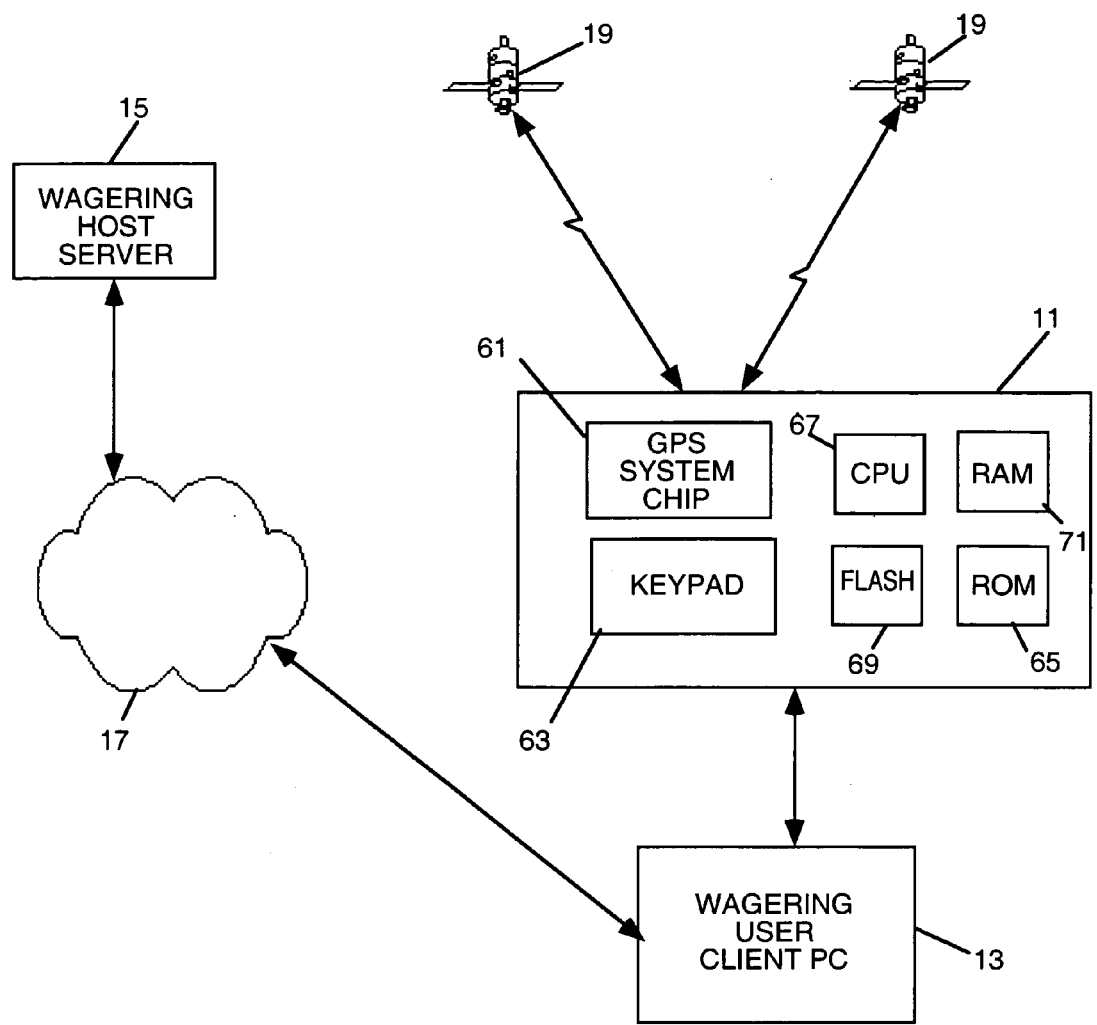
FIG. 1 is a block overview diagram showing a system in which the invention may be utilized.

Referring first to FIG. 1, the invented online bettor location and verification system includes several components. These include a peripheral hardware device (the "PHD") 11 that in one embodiment attaches to a bettor's personal computer, personal digital assistant, wireless phone or internet appliance (PC) 13 and a software application that resides on a wagering host system 15 that communicates over a communications network 17 such as the Internet with both the PHD and the user's PC in order to validate logons, accept and process bets from bettors. The user's PC is linked to the wagering host via either the Internet or a direct connection and uses any industry-standard browser to communicate with the host. There is no special software resident on the personal computer other than "applets" that are automatically downloaded by the host as needed and a "driver" for the PHD. These software components are in the nature of Java™ programs, browser plug-in applications, ActiveX™ components or other software technologies to perform certain functions. Their specific implementation details are not needed for an understanding of the invention, and in any event implementation details of such applets and driver are well within the abilities of a person of ordinary skill in the art.

The PHD is linked to the wagering host via the Internet or a direct connection or a closed-loop network and communicates with the host as described below.

Figure 2:
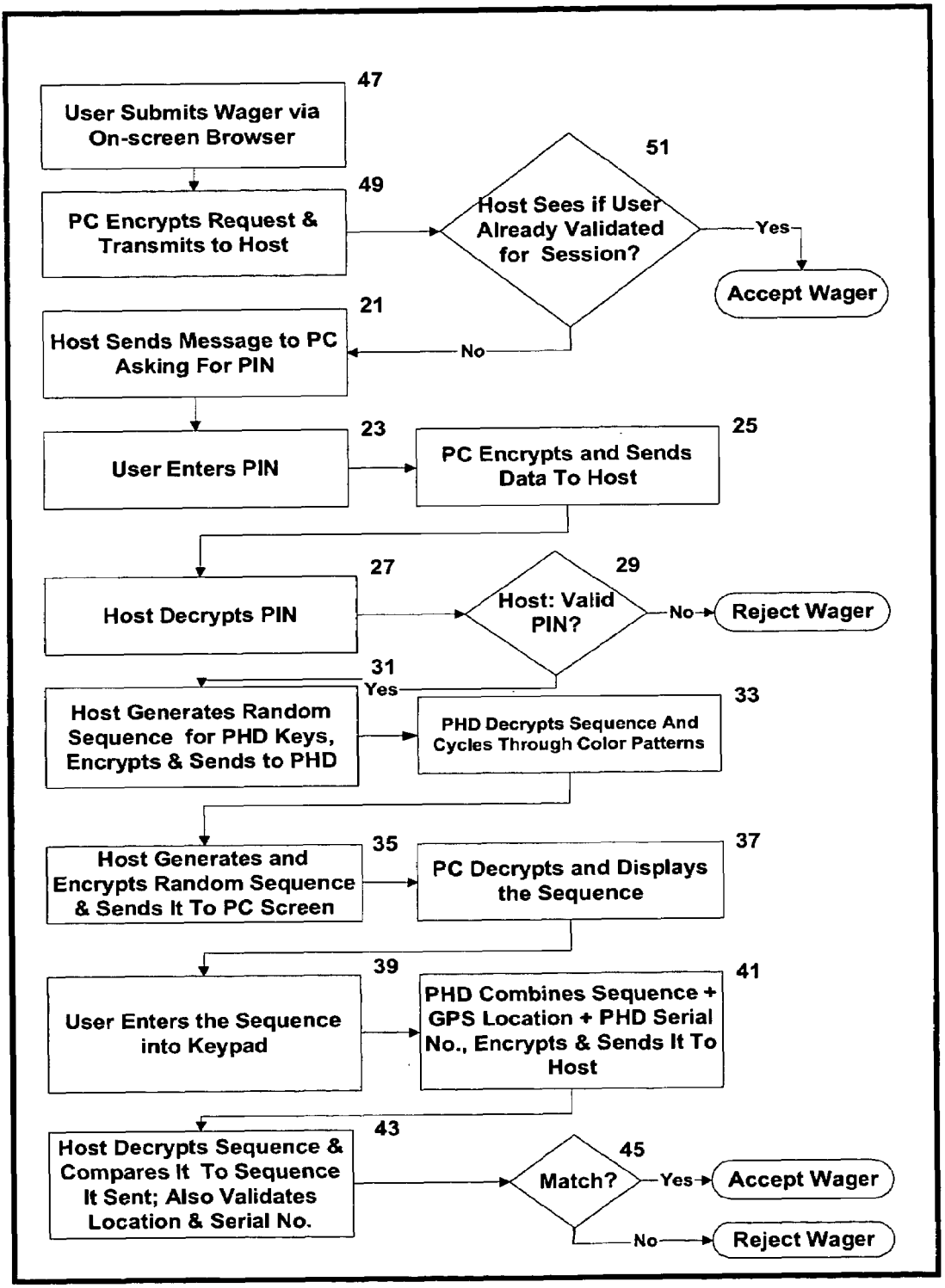
FIG. 2 is a flowchart showing the overall operation of the invention.
Figure 3:
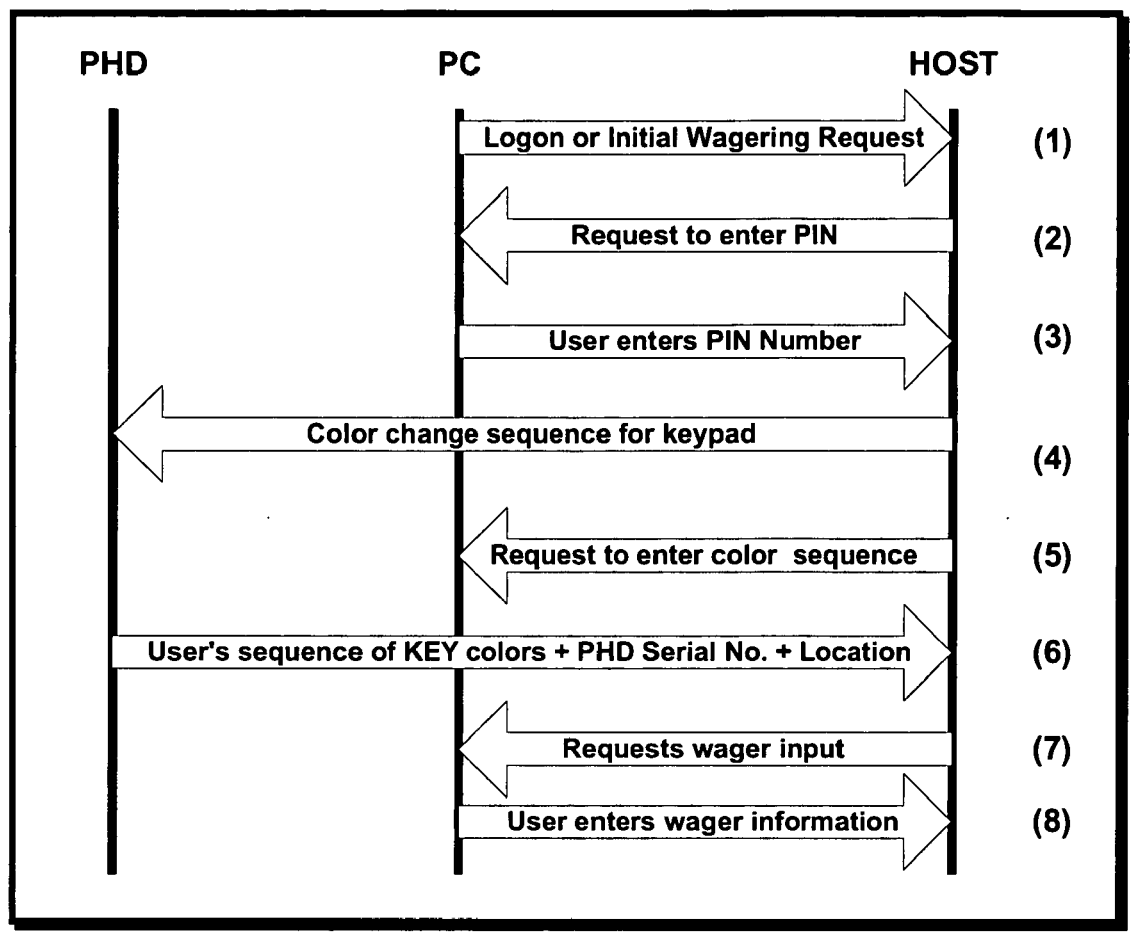
FIG. 3 is a diagram show the flow of data during operation of the system in which the invention is utilized.

The overall operation of the invented online bettor location and verification system is shown in FIGS. 2 and 3. After accessing an online wagering site:

(1) The user initiates the logon process either by explicitly sending a logon request or by trying to make a wager at step 47 before he is logged on. The PC encrypts the request by use of an applet and sends it to the host at step 49.

(2) In either case, the host checks to see if the user is already logged on at step 51. If not, the host sends a message to the user's browser asking the user to enter a personal identification number (PIN) at step 21.

(3) The user enters his PIN, which is encrypted and sent back to the host at step 25. The specifics of the encryption performed are not necessary for an understanding of the invention, and any one of numerous well known encryption algorithms may be employed. The encrypted data is received at the host and decrypted at step 27. The host then validates the PIN at step 29. If this is an invalid PIN the wager or logon request is rejected.

(4) In order to ensure that the user is at the location of the PHD and is also in a proper mental state to wager, the host generates a random sequence of colors or symbols for each of the keys on the PHD device at step 31. The host also generates a random sequence of colors or symbols that will identify the keys on the PHD at step 31. The sequence is encrypted and sent to the PHD, which decrypts the data at step 33.

(5) The encrypted sequence is also sent to the PC at step 35, where it is decrypted and displayed on the user's screen at step 37.

(6) The user enters the sequence that was displayed on the PC screen into the keypad on the PHD at step 39. After each key is entered, the colors or symbols associated with the individual keys on the PHD are changed based on the change sequence that was sent in step 31. The resulting sequence of keystrokes is combined with the serial number that is built into the PHD and with the current location of the PHD, which is determined by the GPS module within the PHD. This information is encrypted and sent to the host at step 41. The host decrypts the information at step 43 and performs several checks at step 45. Specifically, it checks the PHD's serial number to ensure that the user is accessing the system using a device assigned to that user as explained below. In addition at step 45, the host verifies that the GPS device—and therefore the user who entered the keystrokes into the PHD—are in a geographical location that permits on-line wagering. Also at step 45, the host decrypts the sequence and compares the received sequence to the sequence which was sent. If there is a match at step 45, the host approves the logon.

(7) The host sends a message to the user which is displayed on the monitor of the PC that he is permitted to enter a wager.

(8) The user enters the wager which the PC encrypts and transmits to the host.

The invented online bettor location and verification system operates to ensure that the bettor's personal computer is in a state or country that allows the wagering that the bettor intends to engage in. The location is established by utilizing a GPS device built into the PHD. The PHD connects to the user's personal computer through the PC's serial, USB, FireWire, mouse, keyboard or similar port and receives electrical power via that port. In one embodiment, and referring again to FIG. 1, it uses the US Government's GPS satellites 19 to identify the location of the bettor with an accuracy of a few meters. The satellites transmit spread spectrum signals in accordance with a set of prescribed codes as described, for example, in U.S. Pat. No. 5,757,916. Other GPS transmitters such as the Nationwide differential GPS service, NDGPS, could also be used. The GPS device is typically implemented as GPS system chip 61 which determines the longitude and latitude of the PHD based on signals received from satellites 19. The PHD transmits this information to the host 15 via the Internet or a closed-loop network. A suitable GPS system chip is available from Philips as its part no. UAA1570HL and SAA1570HL. The host will then use this information to ensure that the PHD is in a legal location to place a wager using a database that defines legal geographic locations.

The invented online bettor location and verification system also verifies that the user is physically at the location of the PHD 11 and personal computer 13 and not operating the computer from a remote location. This is accomplished by having the host software send a unique, random key such as a sequence of several colors or symbols to the PHD at the start of a logon sequence as described above. This sequence is also sent to and displayed on the screen of the user's personal computer. The user must then enter the key directly into PHD keypad 63, using, for example, a color-coded keypad, which is part of the PHD. In a preferred embodiment using a sequenced color or symbol key, after each color or symbol is entered by the user, the colors or symbol of the input keys incorporate different color or symbol LEDs which cause the keys to display a different color or symbol which must be pressed in the correct sequence and within a set period of time, so it will be very difficult to perform this process by remote control. For example, if the sequence is four colors: red, blue, yellow, green, the keys may initially display green, red, yellow, blue. When the user pressed the second or red key, then the keys change their display, to for example, green, yellow, red, blue requiring the user to then press the fourth or blue key. The keys then change color again after the blue key is depressed. If the keys are pressed within the set time, the PHD sends the sequence, along with its serial number and location information provided by the GPS chip to the host. If the keys are not pressed within the set time, a message so indicating along with the serial number and location information is sent to the host. This process also enables the system to ensure that the bettor is in a proper state of mind to gamble as explained below. If the user is unable to log on after a predetermined number of consecutive attempts, his account will be automatically suspended for a period of time and a message sent to the system operator. A successful logon while using this system will assure that the user is actually at the location of the PHD and is in a proper mental state to place a bet.

Since the GPS system identifies the location of the PHD for the host and the keystroke entries sent from the PHD to the host show that the bettor who entered the PIN is at the PHD, the location of the bettor can be assured. The location of the PC 13 is also assured to be the same as the PHD because a serial or USB connection requires a relatively short cable between the two connected devices.

The invented online bettor location and verification system also validates the identity of the user. This is accomplished by combining two steps. First, the prospective bettor must initially appear in person at a casino with whom he plans to bet and open an online wagering account. He must identify himself and prove that he is of legal age to wager by showing an acceptable identifying document such as a passport or local driver's license. (This step is required by law in Nevada.) At that time, the user will be issued both a PHD device and a Personal Identification Number (PIN). Each PHD contains a unique built-in serial number, which will be entered into the wagering host database along with the user's name and wagering account information.

The invented system will permit the system operator to select one of two options to assure that the bettor continues to be located at the site of the PHD. This prevents the user from having someone sign on for the bettor at the PHD and then remotely taking control of the computer and place wagers from an unknown, remote location.

With the first option, each time the user places a wager, the system host 15 will transmit a sequence of colors to the user's PC screen 13, which the bettor will have to enter by using the PHD's keypad 63 in exactly the same process as the user accomplished during the logon. If the user does not respond within a predetermined time, the system will not accept the wager.

The second option is similar to the first option, except that the host 15 sends a sequence of colors to the user's PC screen 13 at random time intervals. The user must respond in the same fashion as during logon by entering the colors or symbols by using the PHD's keypad 63 within a predetermined time. If at any time the user does not respond within the allowed timeframe, the user will be disconnected from the system.

All logon and wagering-related communication is encrypted using well-known techniques such as 128-bit Secure Socket Layer technology that is part of today's PC systems and is used to secure financial transactions over the net.

All PHD-host communication use private key encryption. Each PHD is assigned a unique 128-bit key, which is stored in flash memory 69 and is inaccessible to the rest of the world. The host has a table of the keys for each of the PHDs that may be linked to the user's PIN. When the user logs in, the host will then know what code to use to encrypt/decrypt all communications with the PHD. Because the encryption is tied to the user's specific PHD, this communication session will only work if the person who logged in has the PHD that was issued to the person who was given that PIN. Further, since the serial number information is encrypted, a user cannot fool the host with software running on the PC since communications from the PHD must include the encrypted serial number.

Since the PHD unit itself will encrypt and decrypt all of these communications, and since the host will only be able to talk with the PHD if it belongs to the person who logged in, it will be virtually impossible to break or spoof this link. This is accomplished by having the host software send a unique key such as a sequence of several colors to the PHD. This sequence is also sent to and displayed on the screen of the user's personal computer. The user must then enter the key directly into PHD keypad 63 by use of a color-coded keypad that is part of the PHD as described above. This will create a secure bi-directional communication path between the PHD and the host.

The system also deters bettors who are under the influence of drugs or alcohol by requiring the user to enter the sequence of colors or symbols into the keypad where the keys are changing colors or symbols after each keystroke. The response must be completed within a predetermined time, or it will "time out" and be deemed a failed logon attempt. Using a predetermined time of, e.g., ten seconds, such a process is extremely difficult to accomplish by an intoxicated or drugged user due to the necessary reaction time required. Moreover, the user's account will be temporarily disabled for a period of time after a predetermined number of consecutive failures to login, so the system will prevent an unsuitable bettor from repeatedly trying to logon until he gets "lucky."

The connection of the PHD to the user's PC is quite straightforward. When the casino gives the PHD to the user, the casino will also instruct the user to go to a specific location on the casino's web site that will be connected to the wagering host. This location will automatically download and install a software driver for the PHD, if it has not previously been installed.

Thereafter, the user simply plugs the device into the PC's serial or USB port before turning on the PC. Currently available operating systems software such as Microsoft Windows will identify the new device and load the appropriate software.

The flow of information between the PHD, PC and host is essentially invisible to the user, except when the user is required to enter the sequence of data into the PHD and his PIN into the PC as previously described.

The PHD is a self-contained device which includes an external antenna to receive GPS satellite signals, a connector to the serial or USB port of a personal computer. The driver running in the PC enables the PHD to communicate with the host using the PC's connection to the network. It is powered over the serial/USB link and includes:

GPS system chip 61 as described above

Keypad 63 as described above.

Read only memory (ROM 65) to hold the program logic for the GPS system, the keypad management, encryption/decryption and external communication with the host and local PC. The necessary programming can be easily created by a person of ordinary skill in the art based on the description provided herein.

CPU 67 such as a SAA1570HL available from Philips Semiconductor.

Flash memory 69 to store the 128-bit key and encrypted serial number.

Random access memory (RAM 71) to hold downloaded information pertinent to the current session.

Although the present invention has been described in terms of certain preferred embodiments, other embodiments apparent to those of ordinary skill in the art are also within the scope of this invention. In this connection, while having particular application in a wagering environment, the invented system and method could be used whenever geographic location and mental state need to be determined before allowing a remote user access to a host computer.

Accordingly, the scope of the invention is intended to be defined only by the claims that follow.

We claim:

1. A verification system comprising:
    a) a GPS circuit to generate signals representing a geographic location;
    b) means for connecting the system to a network;
    c) means for connecting the system to a local computer coupled to said network;
    d) a keypad having a plurality of keys, each key having a changeable color or symbol;
    e) logic means for:
        i) communicating with a remote host computer coupled to said network and with said local computer;
        ii) receiving key sequence information from said remote host computer;
        iii) after a key has been depressed, changing a color or symbol associated with each of said keys based on said received key sequence;
        iv) determining if an attempt has been made to enter a key sequence using said keypad within a predetermined period of time, and if yes, sending said entered key sequence, a serial number and geographic information provided by said GPS circuit to said host computer.

2. The system defined by claim 1 wherein said GPS circuit operates to communicate with GPS satellites and generate a latitude and longitude of said GPS circuit using signals received from said satellites.

3. The system defined by claim 1 wherein said means for connecting the system to a network comprises one of a serial port and a USB port.

4. The system defined by claim 1 wherein said means for connecting the system to a local computer comprises one of a serial port and a USB port.

5. The system defined by claim 1 wherein each of said plurality of keys comprises at least one LED.

6. The system defined by claim 1 wherein said logic means comprises a computer program executed by a processor.

7. The method defined by claim 1 wherein if said determining step determines that said entered key sequence was not entered within said predetermined period of time, a message to that effect, said serial number and said geographic information provided by a GPS circuit are sent to said host computer.

8. A method for verifying location of a user comprising the steps of:
    a) communicating with a remote host computer coupled to a network and with a local computer coupled to said network;
    b) receiving key sequence information from said remote host computer;
    c) after a key of a keypad has been depressed, changing a color or symbol associated with each key of said keypad based on said received key sequence;
    d) determining if an attempt has been made to enter a key sequence using said keypad within a predetermined period of time, and if yes, sending said entered key sequence, a serial number and geographic information provided by a GPS circuit to said host computer.

9. The method defined by claim 8, wherein said GPS circuit operates to communicate with GPS satellites and generate a latitude and longitude of said GPS circuit using signals received from said satellites.

* * * * *